March 13, 1934. J. P. BEM 1,950,652

PEAR CORING APPARATUS

Filed July 29, 1932

INVENTOR.
JOSEPH P. BEM
BY Miller, Boykin & Bried
ATTORNEYS.

Patented Mar. 13, 1934

1,950,652

UNITED STATES PATENT OFFICE 1,950,652

PEAR CORING APPARATUS

Joseph P. Bem, Oakland, Calif., assignor to Pacific Pitting Machine Company, Inc., Fresno, Calif., a corporation of California Application July 29, 1932, Serial No. 625,724

4 Claims. (Cl. 146—52)

This invention relates to fruit pitting machines of the type shown in my copending patents filed under Serial Nos. 492,774 and 614,426, and the objects of the invention are to provide improvements whereby the machine will be better adapted to core pears and similar fruits which have a hard continuation of the stem within as well as an objectionable bloom portion which must be cut out.

As the present improvements relate only to the operating head or cutters and fruit guiding device, the present drawing and description will be limited to these and reference is made to the copending cases for the general construction and operation of the machine, and claims covering the same.

In the drawing Fig. 1 is a plan view of the fruit positioning and guiding arms with the swinging curved coring blade above and the special knives at the ends of the arms.

Figure 1:
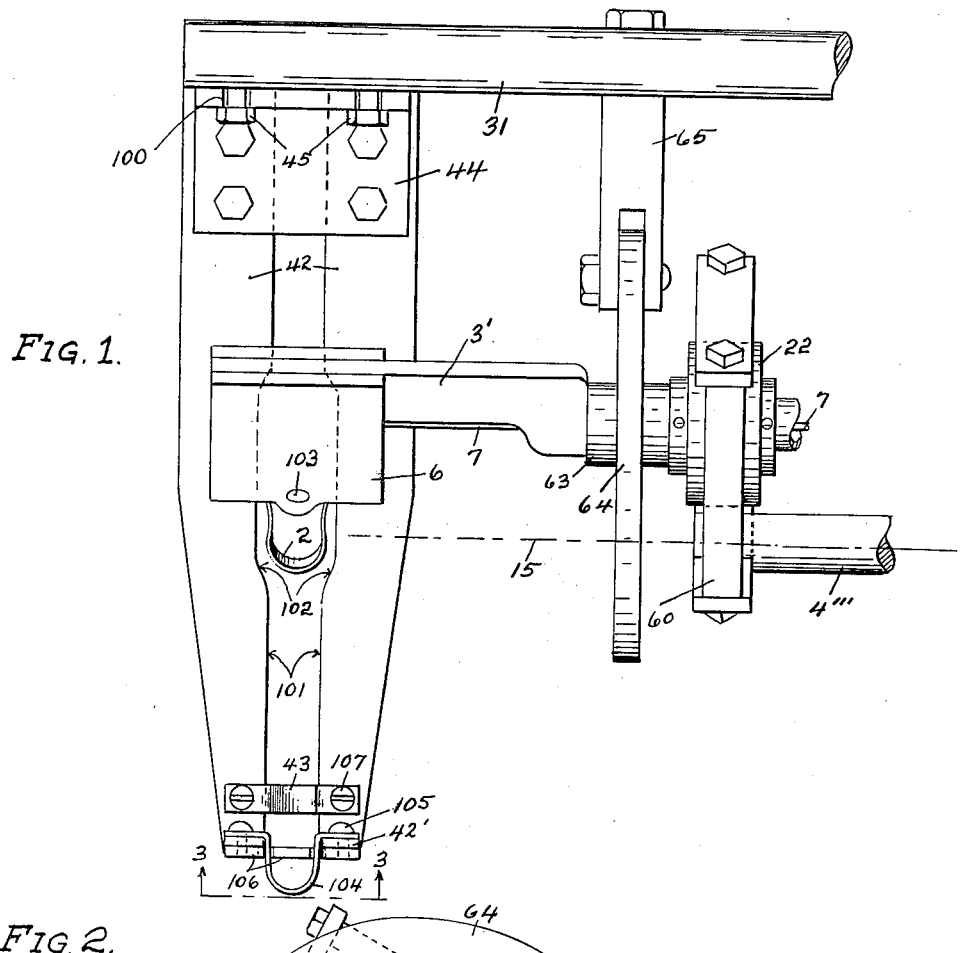

The machine is of the type wherein a previously bisected half fruit is supported in the hand and held cut face upward against a yoke or pair of arms to position the fruit while a curved vibrating blade swings downwardly between the arms and cuts out the core or pit of the fruit. The present invention, however, has nothing to do with the driving or control of the pitting blade, but merely to the fruit aligning arms and special grooving and notching blades thereon.

In the drawing the parts identical to those of my copending cases filed under serial numbers mentioned are correspondingly numbered to establish identity therewith, thus 31 is the fixed supporting arm projecting horizontally from the pedestal of the machine (not shown) and at the end of the supporting arm is a bracket 44 bolted thereto by a couple of tap bolts 45 in open slots 100 on the bracket so that it may be quickly slid in place or removed. This bracket is a short section of angle iron and secured to its lower portion as by the bolts indicated is a pair of horizontally extending arms 42 spaced apart to provide a slot 101 between them, and which slot is widened out somewhat at 102 for a distance in which the arched pitting or coring blade 2 swings. Blade 2 is carried by a housing 6 at the end of a carrier arm 3' which is given back and forth rotary motion by means not shown while the blade 2 may be simultaneously vibrated on the pivot 103 by means of a wire 7 from a source of power not shown and through suitable mechanism within housing 6 not involved in the present invention. The blade carrying arm 3' is provided with a loose roller 22 guided in a yoke 60 carried on the end of the revolvable shaft 4''' which gives motion to the blade 2 through means of the yoke connection to carrier arm 3' when the shaft is given about a half turn back and forth. The axis 15 of shaft 4''' passes through the arched blade 2 substantially in the plane thereof and the blade is arranged so as to be able to rise and fall with respect to fruit aligning arms 42 along a path controlled by the position of the yoke 60 during its partial rotation and also under control of an adjustable cam arm 64 carried on a fixed bracket 65 from main supporting arm 31, the cam operates against a roller 63 on the carrier 3' which is resiliently urged upward by means not shown herein as not involved in the present invention but fully shown and described in my copending patent applications aforesaid.

Figure 2:
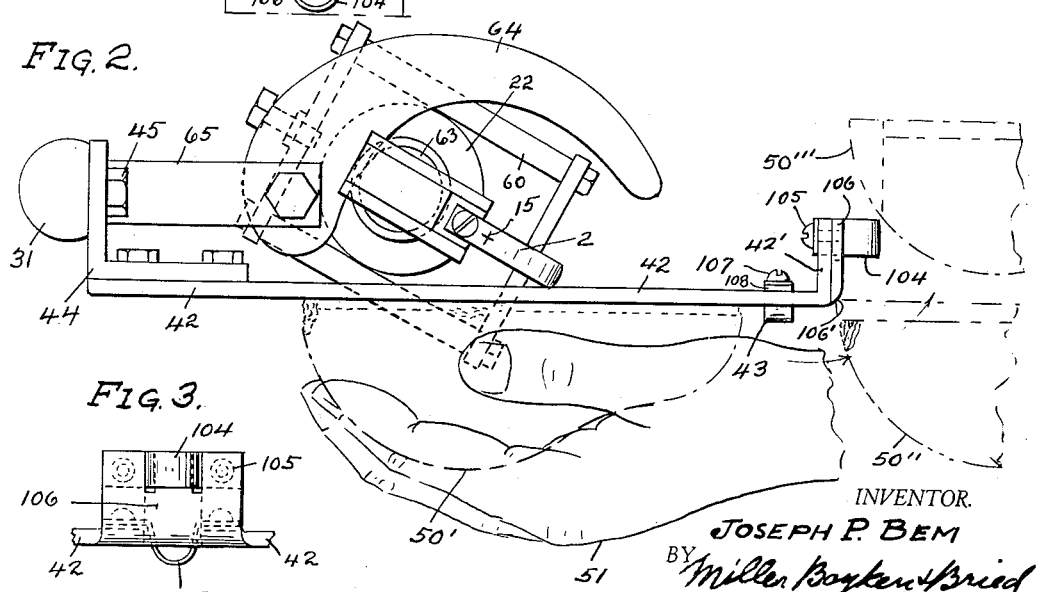
Fig. 2 is a side elevation of Fig. 1 as seen from the left-hand side thereof.
Figure 3:
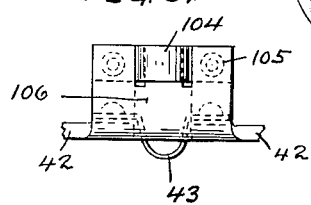
Fig. 3 is an end view of Fig. 1 as seen from the line 3—3 and showing the ends of the arms and the two outer knives only.

Returning now to the fruit aligning arms 42, these are not to support the fruit, but are to enable the operative to align a fruit half with respect to the blade 2, the fruit such as the half pear dotted at 50' being supported in the hand 51 of the girl or operative feeding the machine, and held upward against the lower side of arms 42 in a manner so that the bloom and stem ends will be centrally aligned in the slot 101 between the arms and the core will be just within the arch of the blade 2 which overlies the fruit in the position shown in Fig. 2 at the start of the cut, and which blade is then revolved around axis 15 more or less modified by the cam in this case to follow the elongated core of a pear. As soon as the blade has cut out the core and is clear of the fruit the pear half still grasped by the operative is drawn straight forward to engage a small looped knife 43 and which by a continued forward movement of the fruit will cut a groove out of its center and thereby remove the hard stem portion which extends to the core as well as a hard central portion from the core to the bloom end. When the pear has passed forward beyond knife 43 to position 50'' it is raised vertically and its bloom end passed upwardly through a horizontally extending small looped blade 104 to position 50''' to thereby cut a circular notch in the base of the pear and remove the bloom therefrom.

To support this blade 104 the outer ends of arms 42 are bent upward as at 42' and the ends of the loop-shaped blade 104 are secured against the inner surfaces of the bent up ends as by screws 105 passing through the same and threaded into a cross plate 106 which bridges the slot 101 at this point and is rounded at its lower edge as at 106' for the fruit to slide around as it is brought over the forward corner formed by the arrangement.

Cross plate 106 is slotted at its upper edge so that the thin blade can be dropped into it as best shown in Fig. 1.

The grooving blade 43 is secured in place on the arms 42 at a point a short distance back from their outer ends by screws 107, and depth of cut may be controlled by suitable bushings under the blade as at 108.

The assemblage constituting the two spaced fruit aligning arms 42, slotted bracket 44 and knives 43, 104, forms a unit which may quickly be applied to or removed from supporting bar 31 so that it may easily be substituted for the special devices for the pitting of peaches used on the machines of my copending cases aforesaid. The present arms 42 it should be observed are substantially straight parallel arms and are unobstructed below from knife 43 rearward so that nothing is in the way of the central portion of a half pear no matter how long it may be, and that the slot between these arms forms a means for visibly aligning the stem and bloom end of a pear with respect to the various knives.

While the invention primarily constitutes an attachment making the former machine more adaptable for the coring, grooving and notching of pears, no limitation in use is to be implied thereby.

In coring pears I use a somewhat smaller arched blade as shown herein than would be practicable in pitting peaches as shown in the copending cases, as in the latter use the arch must be large enough to pass over the largest half pit to be encountered, and which provision it is not necessary in coring pears. Unless the pears are green and extremely hard the coring blade need not be vibrated on pivot 103 as it will swing readily through the fruit to be cut out the core upon arm 3' being turned.

Having thus described my invention, I claim:—

1. In a fruit coring machine having a curved blade arranged to swing in an arcuate path for cutting out the core of a fruit half, means for positioning a fruit half relative to said blade comprising a pair of arms spaced to permit passage of the blade, a loop-shaped blade between the arms projecting below the same so as to cut a groove out of the fruit as it is moved along the arms, and a loop-shaped blade at the ends of the arms substantially in a plane parallel to that of the arms arranged for cutting a notch out of the end of the fruit.

2. In a fruit coring machine having a curved blade arranged to swing in an arcuate path for cutting out the core of a fruit half, means for positioning a fruit half relative to said blade comprising a pair of arms spaced to permit passage of the blade, a loop-shaped blade at the ends of the arms projecting outwardly in a manner to notch out the bloom end of a half pear upon moving the fruit across the ends of said arms.

3. In a fruit-half coring machine the combination with a curved main coring blade arranged to swing in an arcuate path for cutting out the core of a fruit-half, and a pair of flat spaced arms between which said blade swings and against which arms a fruit-half is adapted to be positioned for coring, of the forward ends of the arms being upturned, and a looped blade projecting forwardly from the upwardly turned portions of the arms for notching the bloom end of the fruit as it is moved thereover.

4. In a fruit-half coring machine the combination with a curved main coring blade arranged to swing in an arcuate path for cutting out the core of a fruit-half, of means for positioning a fruit-half relative to said blade comprising a pair of flat arms against which the flat cut face of a fruit-half is adapted to be placed, said arms spaced and arranged to permit passage of the main coring blade therebetween, and a loop-shaped blade secured to and projecting from the lower side of the arms in a position to cut a central groove in the fruit as the same is moved along the arms for cutting out other objectionable matter adjacent the main core.

JOSEPH P. BEM.